March 14, 1950      W. D. MACGEORGE      2,500,764

FATIGUE TESTING APPARATUS

Filed March 21, 1945

INVENTOR.
William D. Macgeorge
BY
ATTORNEY

Patented Mar. 14, 1950

2,500,764

UNITED STATES PATENT OFFICE 2,500,764

FATIGUE TESTING APPARATUS

William D. Macgeorge, Drexel Hill, Pa., assignor to The Baldwin Locomotive Works, a corporation of Pennsylvania Application March 21, 1945, Serial No. 584,019

8 Claims. (Cl. 73—67)

This invention relates to material-testing machines, more particularly to fatigue-testing machines of the type in which the material or specimen is subjected to continued vibration and has for an object the provision of a system in which the applied stress is controlled by the strain produced in the specimen.

Heretofore, material specimens, generally rather thin and long, have been subjected to vibration or continual reversal of stresses therein at a predetermined frequency for fatigue and life tests thereof. The difficulty has been that no control was had over the extent of the stress. The specimen was vibrated until mechanical failure thereof.

In carrying out the present invention in one form thereof, the specimen is so vibrated as to maintain the strain in the specimen constant throughout the length of the test. In response to the strain in the specimen, the frequency of vibration is determined and the driving power applied to the specimen is so controlled as to maintain substantially constant the strain produced in the specimen upon reversal of stresses therein. In one form of the invention a magnetic force, which varies in accordance with changes in the strain, is applied to assist or oppose a second magnetic force, thereby to produce vibration of the specimen. A pivoted arm for supporting the specimen carries one of a pair of electromagnets and also bears against a rubber cushion which forms a dampening means to stabilize the operation thereof. The other electromagnet is supported from the frame in co-operative relation with the first electromagnet.

For further objects and advantages of the invention, reference should be had to the following description taken in conjunction with the accompanying drawing, in which.

Figure 1:
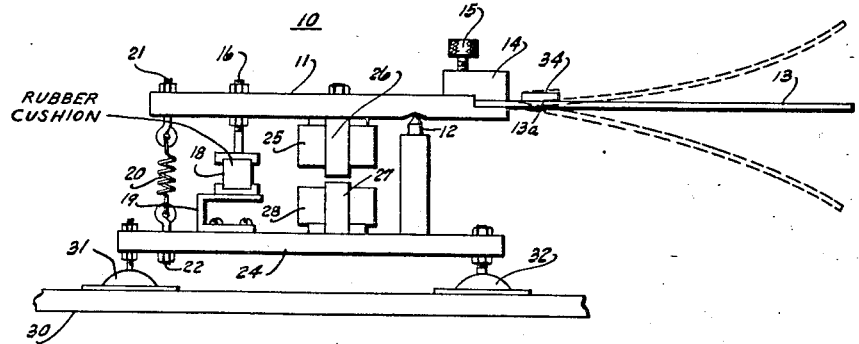
Fig. 1 is a side view of a fatigue-testing machine.

Referring to the drawing, the invention in one form has been shown as applied to a fatigue-testing machine 10, comprising a vibratory arm 11 pivoted as by the knife edge 12 adjacent one end thereof. The material specimen 13 is in the form of a relatively thin, elongated strip, one end of which is secured to the arm 11 as by a clamping member 14, provided with a clamping screw 15. By means of an adjustable rod 16 secured to the arm 11, as by a pair of nuts, the arm 11 effectively presses against a rubber cushion 18, supported in a bracket 19. Though not essential, a light spring 20 may be secured at one end to an eye bolt 21 extending through the arm 11 while the opposite end thereof is secured to an eye bolt 22 extending through a member 24, comprising a supporting base for the machine 10.

An electromagnet 25 is secured to the arm 11 intermediate the ends thereof, with its magnetic core 26 disposed in cooperative relation with the magnetic core 27 of a second electromagnet 28, secured to the member or baseplate 24. To minimize transference of vibration to the supporting surface 30—a table top, bench or floor—rubber anti-vibration devices 31 and 32 are provided.

To produce vibration of the arm 11, alternating current and direct current are applied, respectively, to the two electromagnets 25 and 28. The periodic reversal of the alternating current produces vibration of the arm 11 about its pivot 12. This vibration causes the material specimen 13 to vibrate. It first occupies one of the dotted-line positions and then the other dotted-line position. In moving between these dotted-line positions, substantial stresses are produced in the region 13a. The stresses reverse in direction each time the specimen 13 passes through its mid-position. There is only one magnetic circuit between the cores of the electromagnets 25 and 28.

Figure 2:
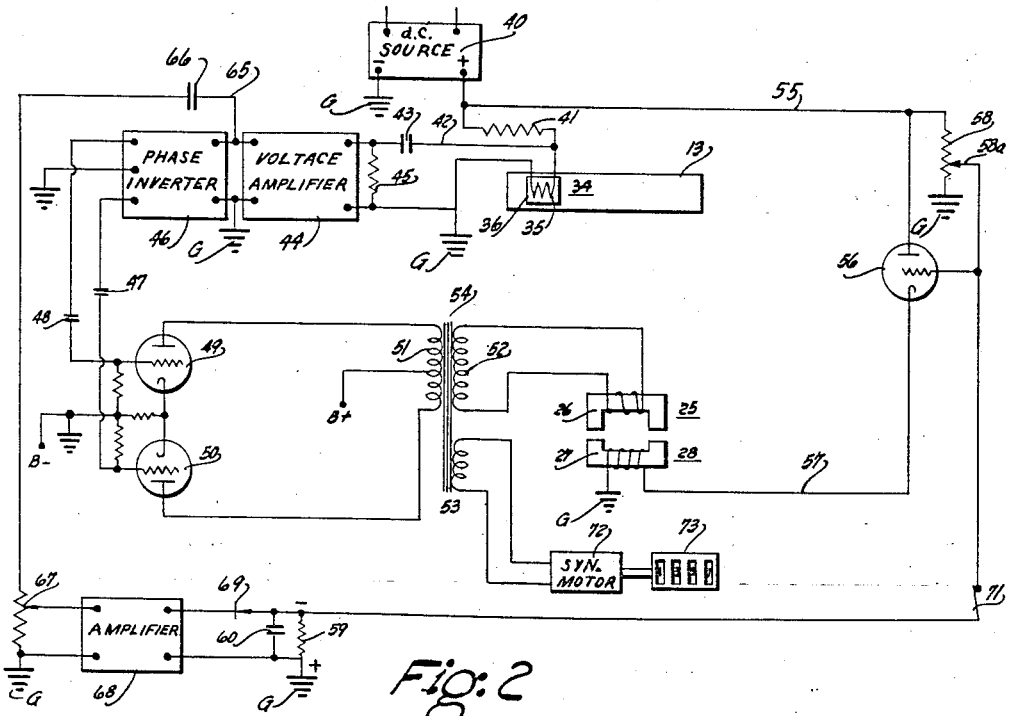
Fig. 2 is a wiring diagram in which the system as a whole has been illustrated.

Further in accordance with the invention, a strain-responsive element 34 is secured to the specimen 13 in the region of maximum stress. This strain-responsive element preferably consists of a relatively fine wire 35, wound back and forth across mounting paper 36, as schematically shown in Fig. 2. The mounting paper and wire are adhesively secured to the specimen 13. For more detailed information with respect to the strain gage or element 34, reference may be had to Simmons Patent No. 2,292,549 of August 11, 1942. It is sufficient here to say that the resistance of the wire 35 varies with the strain imposed upon the specimen 13 in the region 13a.

Further in accordance with the invention, the driving power applied to the arm 11 is controlled in accordance with variations in the strain as evidenced by changes in the resistance of the wire 35. The gage 34 is excited by direct current through a circuit which may be traced, Fig. 2, from one side of a D. C. source of supply 40 by way of resistor 41, the gage-wire 35, and the ground connection G to the other side of source 40. Upon vibration of the specimen 13, the variation in resistance of the gage-wire 35 produces a variable or pulsating current which is applied by way of conductor 42 and a coupling-capacitor 43 to the input circuit of a voltage amplifier 44. An impedance-matching resistor 45 may be connected across the input terminals of the amplifier 44. The output from the voltage amplifier 44, of conventional design, is applied to a phase inverter 46, of conventional design, which is capacitively coupled as at 47 and 48 to the respective input circuits of amplifier tubes 49 and 50 connected in push-pull. This push-pull amplifier is also of more or less conventional design. Preferably it operates as a class A amplifier.

The output circuit includes the primary winding 51 of an output transformer 54 having secondary windings 52 and 53. The secondary winding 52 applies driving power to the core of the electromagnet 25. From the standpoint of operation, the driving power may be applied to the coil of either magnet 25 or 28. It will be seen that the alternating current applied to the magnet 25 is derived directly from the gage 34 and that the periodicity thereof will be the same as the periodicity of the vibration of the material specimen 13. In general, the vibration of the specimen will be at its resonant or natural frequency. The coil of the magnet 28 is excited from the D. C. source of supply 40 through a circuit which may be traced by way of conductor 55, an electric valve 56, conductor 57, the coil, and ground connection G. The conductivity of the valve 56 is under the joint control of a variable biasing resistor 58 and a variable biasing circuit which includes resistor 59 and capacitor 60. The resistor 58 will be selected so as to produce a substantially normal excitation of the electromagnet 28, i. e., sufficient excitation for substantial vibration of the specimen 13. The excitation of the magnet 28 is varied in accordance with change in the strain developed in the specimen 13. This is accomplished by deriving from the strain-gage 34 a signal which is applied by way of conductor 65 and coupling capacitor 66 to a resistor 67. The signals developed across the resistor 67 are applied to an amplifier 68, of conventional design. The output from the amplifier 68 is then applied through a circuit which includes a rectifier 69 and the resistor-capacitor combination 59 and 60. In this manner, the bias on the valve 56 varies inversely with the change of strain in the specimen 13.

More specifically, as the strain increases, the amplitude of the signals applied to resistor 67 will increase. This increase in amplitude will be reflected in the output circuit of the amplifier 68. Accordingly, the negative bias produced across the resistor 59 will increase in the negative direction. This will reduce the conductivity of the valve 56, thereby to reduce the excitation of the magnet 28. The result of decreasing the excitation will be to decrease the driving power applied to the specimen 13 and hence the amplitude of vibration will lessen and the strain will decrease. The system as described will operate effectively to maintain the strain in the element 13 at a substantially constant value.

It has been found that in the fatigue testing of materials there is a substantial change in the strain during the course of the tests, this change being due to changes in temperature and internal changes which take place in the material during the course of the tests. Heretofore it has not been possible accurately to control the strain during the fatigue testing of materials. It may be further observed that the invention is applicable to the testing of metallic or non-metallic materials for the reason that the strain-gage 34 responds to changes of strain in the material, which changes, as they affect the gage 34, are entirely independent of the kind of material of which the specimen 13 is composed.

Inasmuch as one magnet 25 determines the periodicity of vibration, and the other magnet 28 serves as a ready means to control the driving power applied to the specimen, predetermined programs of testing may be readily arranged. Specifically, the contact 58a, associated with resistor 58, may be slowly moved in one direction or the other to provide a constant change in the bias of the tube 56, gradually to increase or to decrease the strain produced in the element 13. For operation of such a modification it will be desirable to open the strain-controlling circuit as by a switch 71.

It will be observed the winding 53 of the output transformer 54 is directly connected to a synchronous motor 72 which is arranged to drive a counting device 73. Since the synchronous motor 72 will rotate at a speed dependent upon the frequency of the applied current, the counter 73 may be calibrated so as to yield directly the number of reversals of stress which have taken place in the specimen 13.

Again referring to Fig. 1, it is to be understood the construction of the machine may be varied without departing from the invention. The cores 26 and 27 may be U-shaped as illustrated in Fig. 2, or they may be of E-shape, or they may be simple cylindrical cores. The bumper or rubber cushion 18 is a relatively important feature of the invention. Though rubber need not be utilized, a compressible material is desirable providing it is elastic and provides a damping effect. The spring 20 may in some cases be omitted, although its presence is desirable to eliminate play or free movement of the arm 11, in the absence of excitation of the magnets 25 and 28. The knife edge 12 may be replaced by a roller bearing or other suitable pivotal supporting means for the arm 11.

It is to be understood that further modifications of the invention may be made without departing from the spirit and scope thereof, as set forth in the appended claims.

What is claimed is:

1. A fatigue-testing system comprising a vibratory arm, means pivotally mounting said arm intermediate the ends thereof, means for securing to said arm on one side of said means a specimen to be subjected to a fatigue test, resilient damping means for applying a damping action on said arm at the opposite side of said pivotal support, means carried by said specimen and responsive to strain developed therein, and means under the control of said strain-responsive means for producing and maintaining vibration of said arm at its resonant frequency.

2. A fatigue-testing system comprising a vibratory arm, a pivotal support for said arm disposed intermediate the ends thereof, means for securing to one end of said arm on one side of said support a specimen to be subjected to a fatigue test, a spring connected to said arm for holding it in a substantially normal position when the system is inactive, damping means and actuating means located on the opposite side of said pivotal support for respectively applying a damping action and a driving force to said arm, means carried by said specimen and responsive to strain developed therein, and means responsive to said strain-responsive means for so controlling said actuating means as to maintain vibration of said arm at its resonant frequency.

3. A fatigue-testing system comprising a vibratory arm, a pivotal support for said arm disposed intermediate the ends thereof, means for securing to one end of said arm on one side of said support a specimen to be subjected to a fatigue test, strain-responsive means attached to said specimen, a spring connected to said arm for holding it in a substantially normal position when the system is inactive, damping means and actuating means located on the opposite side of said pivotal support for respectively applying a damping action and a driving force to said arm, means responsive to said strain-responsive means for controlling operation of said actuating means for maintaining vibration of said arm at its resonant frequency, and means including a direct current coil energized under the control of said strain-responsive means for applying an attractive force to said arm of magnitude which maintains at a substantially constant value the output of said strain-responsive means.

4. A fatigue-testing system comprising a vibratory arm, means for securing to said arm a specimen to be subjected to a fatigue test, means carried by said specimen and responsive to strain developed therein, means for vibrating said arm comprising a pair of electromagnets, one of which is secured to said arm and the other of which is relatively stationary and spaced therefrom, means responsive to said strain-responsive means for applying direct current to one of said electromagnets to maintain constant said strain, and means responsive to said strain-responsive means for applying alternating current to the other of said electromagnets.

5. A fatigue-testing system comprising a vibratory arm, means for securing to said arm a specimen to be subjected to a fatigue test, means carried by said specimen and responsive to strain developed therein, means for vibrating said arm comprising a pair of electromagnets, one of which is secured to said arm and the other of which is relatively stationary and spaced therefrom, means for applying direct current to one of said electromagnets, means responsive to said strain-responsive means for applying alternating current to the other of said electromagnets, and means responsive to said strain-responsive means for varying said direct current inversely with change in the magnitude of the strain developed in said specimen.

6. A fatigue-testing system comprising a vibratory arm, means for securing to said arm a specimen to be subjected to a fatigue test, means carried by said specimen and responsive to strain developed therein, means for vibrating said arm to produce periodic reversal of stresses in said specimen comprising a pair of electromagnets, one of which is secured to said arm and the other of which is relatively stationary and spaced therefrom, means for applying direct current to one of said electromagnets, means responsive to said strain-responsive means for applying alternating current to the other of said electromagnets having a periodicity the same as that of the stresses in said specimen, and means responsive to said strain-responsive means for increasing and decreasing said direct current as the amplitude of said alternating current increases and decreases thereby to maintain substantially constant the strain developed in said specimen.

7. A fatigue-testing system comprising a vibratory arm, means for securing to said arm a specimen to be vibrated at its resonant frequency thereby to produce periodic reversal of the stresses therein, means carried by said specimen and responsive to strain developed therein, means for vibrating said arm comprising a pair of magnet coils disposed with respect to said arm for applying forces thereto in accordance with the energization of said coils, an amplifier having input and output circuits, means connecting said strain-responsive means in said input circuit to produce an alternating current in the output circuit having a periodicity the same as the resonant frequency of said specimen, means for energizing one of said coils in accordance with the current in said output circuit, means for rectifying alternating current from said output circuit, and means for exciting the other of said coils with a direct current the magnitude of which varies with the amplitude of said alternating current.

8. A fatigue-testing system comprising a vibratory arm, means for securing to said arm a specimen to be subjected to a fatigue test, means carried by said specimen and responsive to strain developed therein, a pair of magnet coils disposed adjacent said arm for producing vibration thereof, means for applying direct current to one of said coils, and means responsive to said strain-responsive means for applying alternating current to the other of said coils.

WILLIAM D. MACGEORGE.

REFERENCES CITED

The following references are of record in the file of this patent:

UNITED STATES PATENTS

| Number | Name | Date |
| --- | --- | --- |
| 2,252,464 | Kearns et al. | Aug. 12, 1941 |
| 2,299,424 | Peters | Oct. 20, 1942 |
| 2,359,245 | Ritzmann | Sept. 26, 1944 |
| 2,361,396 | Gross | Oct. 31, 1944 |
| 2,373,351 | Sims | Apr. 10, 1945 |

FOREIGN PATENTS

| Number | Country | Date |
| --- | --- | --- |
| 427,989 | Great Britain | May 3, 1935 |
| 445,887 | Great Britain | Apr. 20, 1936 |